June 2, 1959   M. S. DE LAY   2,889,154
ADJUSTABLE KING PIN AND LANDING GEAR ASSEMBLY FOR TRAILER TRUCKS
Filed Sept. 22, 1958   2 Sheets-Sheet 1
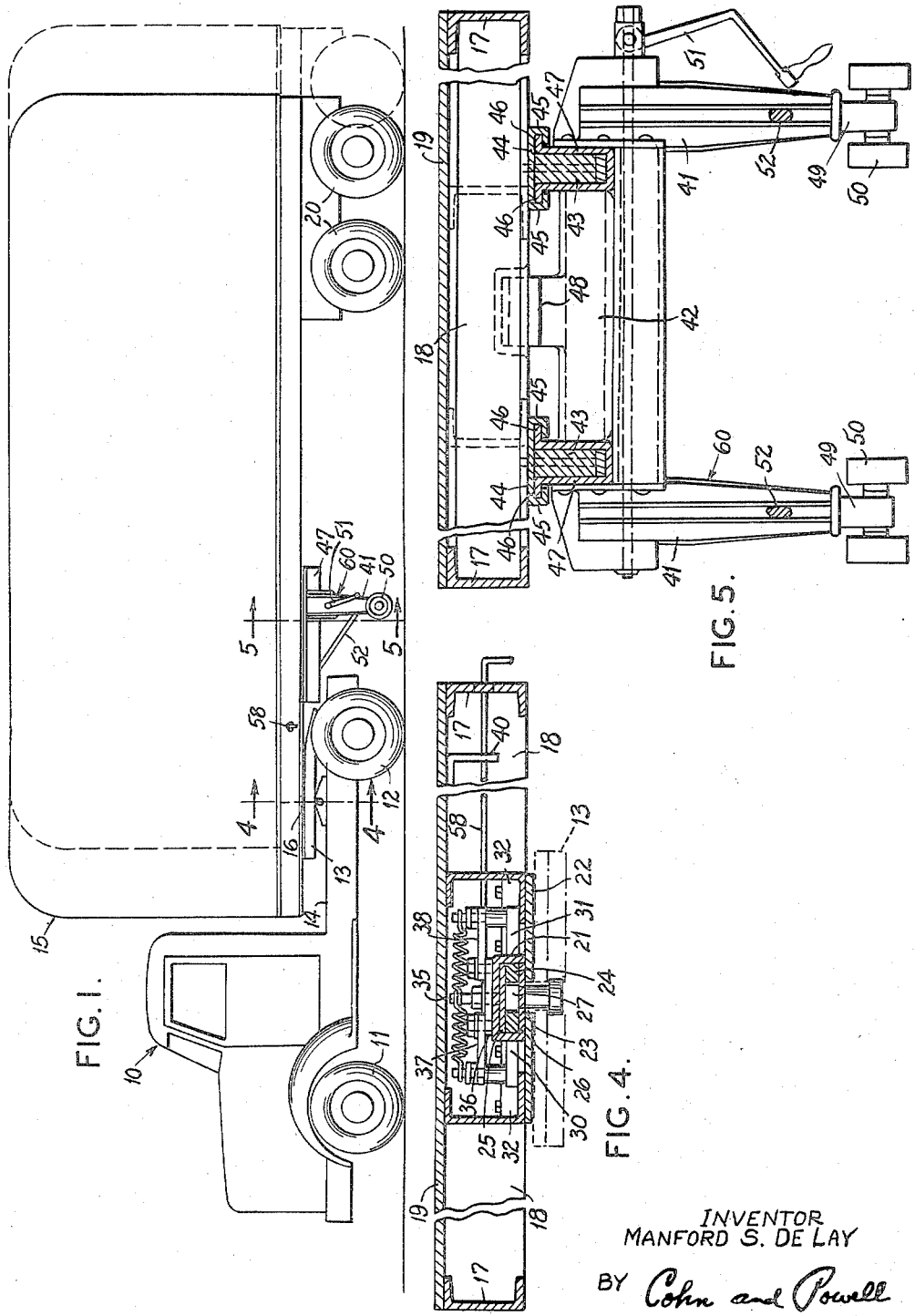
INVENTOR
MANFORD S. DE LAY
BY Cohn and Powell
ATTORNEYS June 2, 1959  M. S. DE LAY  2,889,154
ADJUSTABLE KING PIN AND LANDING GEAR ASSEMBLY FOR TRAILER TRUCKS
Filed Sept. 22, 1958  2 Sheets-Sheet 2
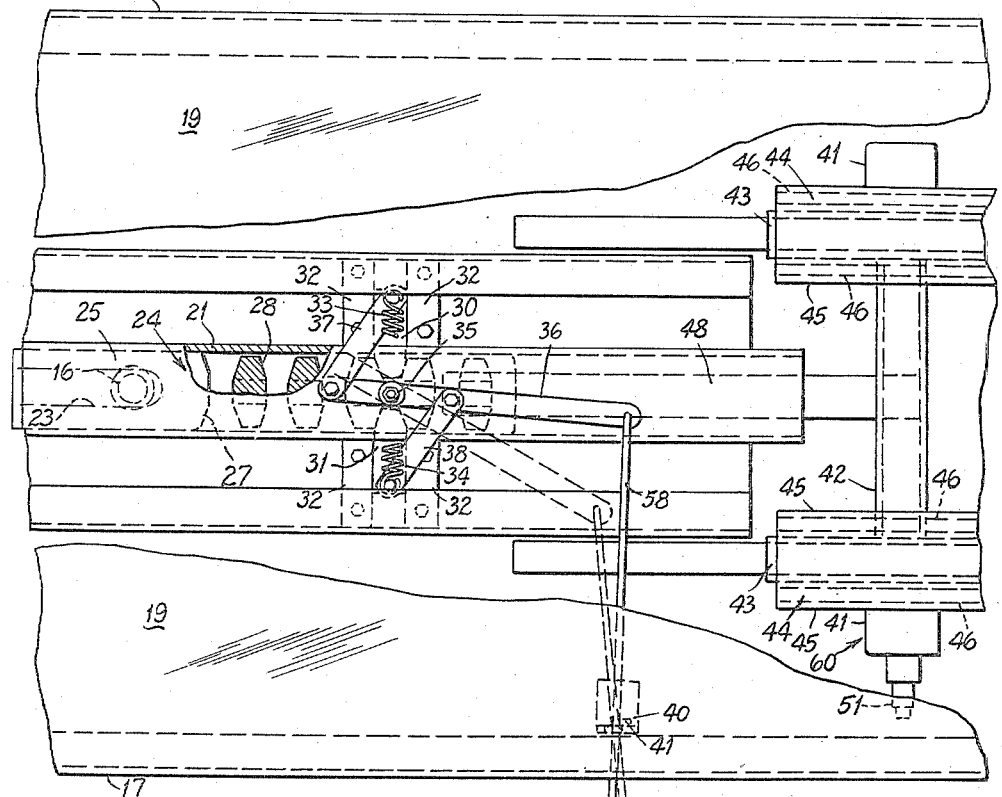
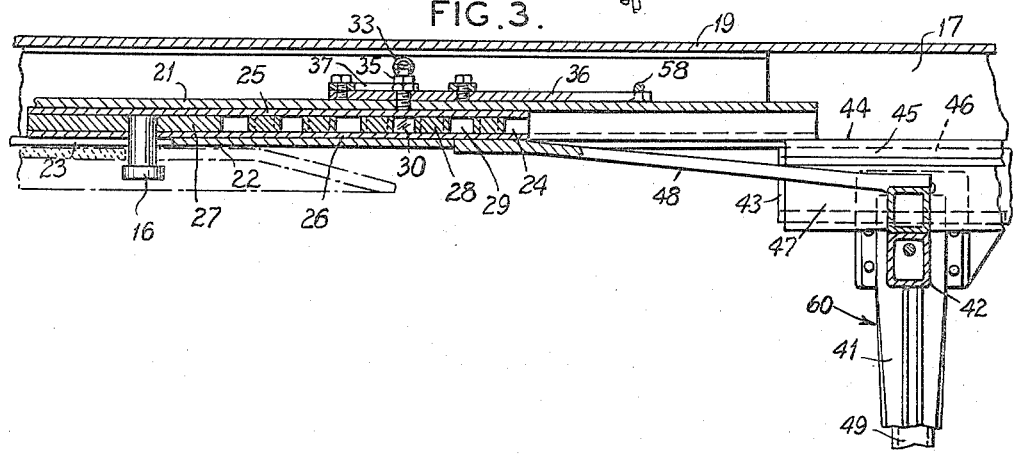
INVENTOR
MANFORD S. DE LAY
BY Cohn and Powell
ATTORNEYS

United States Patent Office 2,889,154
Patented June 2, 1959

2,889,154

ADJUSTABLE KING PIN AND LANDING GEAR ASSEMBLY FOR TRAILER TRUCKS

Manford S. De Lay, St. Louis, Mo.

Application September 22, 1958, Serial No. 762,447

7 Claims. (Cl. 280—407)

The present invention relates to improvements in tractor-trailer trucks generally and particularly to an adjustable king-pin and landing gear organization.

An important object of the invention is to provide improved coupling means whereby the effective length of the coupling members and the distance between centers of the tractor and the trailer may be varied.

Another object is to provide coupling means in combination with landing gear, arranged for coordinated adjustment and the provision of a single locking means for both agencies.

These and other objects and advantages will appear from the following description of a practical embodiment of the invention wherein reference is made to the accompanying drawings in which:

Fig. 1 is a side elevational view showing a trailer as coupled by the means of the present invention in two different operating relationships with its tractor;

Fig. 2 is a fragmentary plan view showing the king pin, draw-bar, and landing gear organization;

Fig. 3 is a side elevational view of the organization illustrated in Fig. 2;

Fig. 4 is a transverse sectional view of the draw bar assembly taken at line 4—4 of Fig. 1, and Fig. 5 is a transverse sectional view taken at line 5—5 of Fig. 1.

Tractors equipped with longitudinally adjustable coupling members are known in the art. Such means are shown, for example, in my U.S. Patent No. Re. 23,704. That disclosure involves means for shifting the so-called fifth wheel on the tractor for effecting a redistribution of the load imposed thereon by the trailer in desired proportions, as between the tractor's front and rear wheels. Such adjustments, as is understood, do not effect the loading on the rear wheels of the trailer. Means to vary the wheel loading of the trailer are desirable in highway transports, as is also provisions for changing the spacing relationship between tractor and trailer. Such advantages are realized in the improved coupling means of the present invention which includes provisions for concurrently changing the location of the trailer king pin and landing gear. The combined adjustment of these agencies precludes interference between the tractor and landing gear when the units are disposed in a close coupled relation, assuring clearance between those parts in all positions of the units. Landing gear adjustment also enables the loading on the rear wheels of the trailer to be varied when detached from the tractor.

Referring now to the drawings, a conventional motor vehicle of the tractor-trailer type is illustrated in Fig. 1. The tractor 10 has front and rear wheels 11 and 12 respectively, and a so-called fifth wheel 13 for coupling purposes, mounted on the rear deck 14 of the tractor bed frame. The fifth wheel 13 presents a flat, generally horizontal bearing surface to receive and support the forward end of the trailer, designated 15. It is provided with a central opening to receive and make connection with the king pin of the trailer truck, which member is designated 16 in Figs. 2 and 3.

The base or bed frame of the trailer 15 comprises side members 17 and cross sills 18, overlaid by a steel deck plate 19. At its rear end the trailer is supported by a single or tandem set of ground wheels 20.

The bed frame of the trailer is provided at its forward end with a centrally located channel 21, such member extending longitudinally of the trailer frame from its forward end. Channel 21 is welded or otherwise suitably secured to other structural frame members, and to an underlying bearing plate 22 which rests upon the upper surface of the fifth wheel 13 when the tractor and trailer are coupled together. Bearing plate 22 is provided with a longitudinal slot 23 through which slot passes the neck portion of the king pin 16.

The king pin 16 is rigidly secured to and depends from a draw-bar 24, which member is disposed for longitudinal sliding movement in the guideway constituted and defined by the channel member 21.

In a presently preferred form draw-bar 24 consists of upper and lower elongated plates 25 and 26 respectively welded to an intervening spacer block 27 at the forward end of the assembly, which spacer block affords a solid base for securement of the king pin 16. Also intervening and welded to the upper and lower plates of draw-bar 24, rearwardly of the spacer block 27 are spaced spacer blocks 28 having angularly related side walls that define spaces 29 between adjacent blocks, which spaces are adapted to receive in closely fitted relation the tapered nose portions of lock members 30 and 31. These members serve rigidly to secure the draw-bar 24 in any of a number of positions of longitudinal adjustment within the range determined by the distance between the forwardmost and rearwardmost of the spaces 29.

Lock members 30 and 31 project through openings in the side flanges of channel 21. They are positioned for sliding movement by the guide blocks 32, which are secured by bolts to the underlying bearing plate 22.

The lock members 30 and 31 are constantly urged inwardly toward a locking position by means of tension springs 33 and 34 connected between the outer ends of the lock members and a central pivot stud 35. The lock members are adapted to be withdrawn simultaneously from the recesses in the draw-bar, to free the latter for adjusting movement, by means of a lever 36 pivoted on the pivot stud 35. Links 37 and 38 pivotally interconnect the lever 36 each with one of the members 30 and 31. Lever 36 is adapted to be actuated by means of a rod 58 that extends from the end of the lever to a point at one side of the trailer bed frame. The outer end of rod 58 passes through a slotted opening 39 in a bracket 40. A projecting finger 41 on rod 58 engages bracket 40 to hold the rod in an extended position, corresponding to a retracted position of the locking members 30 and 31 whereby the draw-bar is free for adjustment. Control rod 58 may be shifted laterally to cause the projecting finger 41 either to clear or engage the bracket as desired.

From the description thus far it will be understood that the draw-bar 24 with its king pin 16 is capable of being shifted longitudinally in the bed frame of the trailer and is capable of being locked in any of a series of longitudinal settings by the members 30 and 31.

The trailer is provided with means for supporting its forward end when detached from the tractor, such means being the so-called landing gear designated generally at 60. The landing gear comprises a pair of hollow leg members 41 secured to the ends of a transverse beam 42. The assembly is mounted for longitudinal sliding adjustment on a pair of rails 43 which are secured to transverse sill members of the bed frame. The rails 43 are fixedly mounted in base channels 44 having inturned flanges 45 that form guideways to slidingly receive the outwardly turned flanges 46 of slide brackets 47. Those brackets are fixed to the transverse beam 42 of the landing gear and form a part of the adjustable assembly.

A tie bar 43, welded at its ends to the draw-bar 24 and to the cross beam 42 of the landing gear 40 rigidly connects those parts together. Thereby the draw-bar and landing gear are movable as a unit on the bed frame of the trailer. Both of said agencies are adapted to be locked in adjusted position by the described locking means.

The landing gear is preferably of the retractable type. The leg members have extensible post portions 49 which carry the small ground wheels 50 at their lower ends. Posts 49 are adapted to be extended or retracted by suitable mechanism, not shown, operated by means of the hand crank 51. A diagonal bar 52 is provided to brace the leg members.

With the herein described means adjustment of the king pin to obtain a longer or shorter coupling relationship between the truck and tractor is readily accomplished as follows: With the brakes on the rear trailer wheels applied, and the lock control rod 58 drawn outwardly and retained in an outward position to hold the locking members 30 and 31 free of the draw-bar, the operator applies power to inch the tractor forwardly or rearwardly as desired, causing the king pin and draw-bar to move correspondingly relative to the trailer body. When the desired coupling relationship has been approximately reached the lock control rod 38 is disengaged from its detaining bracket 40, whereupon springs 33 and 34 will either move the bolts into locking engagement with the draw-bar or, if the bolts are out of registry with recesses in the locking bar, will impel them into locking position when initial tractor movement establishes an aligned relationship between locking bolts and the nearest pair of draw-bar recesses.

By reason of the described provisions the landing gear cannot interfere with or place limitations on the range of king pin adjustment. There is at all times a fixed distance between king pin and the legs of the landing gear, the said distance being such as to assure clearance between the landing gear and the tractor deck when the king ping and draw-bar assembly is in its rearmost adjusted position.

It will be understood that various changes may be made in the various instrumentalities shown and described herein without departing from the spirit and full intendment of the invention which is defined by the appended claims.

I claim as my invention:

1. In combination in a trailer, a body having a bed frame including longitudinally extending rail members, a wheel and axle assembly supporting the rear end of said body, landing gear assembly for supporting the end of the trailer body at its forward end, means mounting said landing gear for sliding adjusting movement on said bed rails, a draw bar forwardly of said landing gear, means mounting said draw bar for longitudinally sliding movement in said bed frame, means rigidly interconnecting said draw bar and landing gear, and releasable means for locking said draw bar against movement relative to said bed frame.

2. In a truck trailer, a bed frame having parallel rail members, supporting wheels at the rear end of the bed frame, retractable landing gear, slidable means mounting said landing gear for adjustment along said rail members, a draw bar, means mounting said draw bar forwardly of said landing gear for longitudinal adjusting movement, a king-pin carried by said draw bar, a rigid coupling element interconnecting said landing gear and draw bar for conjoint adjusting movement, and releasable locking means coacting with said draw bar.

3. In a truck trailer, a bed frame including longitudinal rail members, supporting wheels at the rear end of the bed frame, means forming a longitudinal guideway at the forward end portion of said bed frame, a draw-bar slidably mounted in said guideway, said draw bar having a series of spaced recesses formed in at least one side thereof, a locking bolt on the bed frame engageable with said draw bar selectively at any one of said recesses, landing gear slidably mounted on said guide rails, and a rigid link connecting said landing gear to said draw bar.

4. In a trailer including a bed frame having rear ground wheels, parallel rail members extending longitudinally at the front end portion of the bed frame, retractable landing gear slidably mounted on said rail members for longitudinal adjustment relative to said bed frame, a draw bar slidably mounted for longitudinal adjustment on the bed frame, a rigid connection between said draw bar and landing gear and locking means for said draw bar.

5. In a truck trailer including a bed frame having ground wheels at the rear end and spaced rails extending longitudinally at the front end thereof, retractable landing gear including a transverse member, legs depending from the ends of said transverse member, guide shoes on said transverse member slidably engaging said rails, said landing gear being thereby adapted for longitudinal adjustment on the trailer bed frame, a draw bar extending longitudinally between said guide rails, means rigidly securing said draw bar to said transverse member of the landing gear and locking means on said bed frame coacting with said draw bar.

6. In a truck trailer including a bed frame having longitudinal rail members, landing gear slidably mounted on said rail members for longitudinal adjustment relative to the bed frame of the trailer, means forming a longitudinal guideway in said bed frame, centrally between said rails and forwardly of said landing gear, an elongated draw bar slidable in said guideway, said draw bar having a series of spaced recesses formed in opposite sides thereof, rigid means connecting said draw bar and landing gear, opposed locking bolts arranged transversely of said guideway, said bolts being adapted to engage recesses in said draw bar, and lever means connected to said locking bolts for withdrawing the same to an unlocked position relative to said draw bar.

7. In a truck trailer, a bed frame including a horizontal longitudinally slotted bearing plate secured to the forward underside of said bed frame, means fastened to the upper side of said bearing plate forming a guideway extending along the slot in said bearing plate, a draw bar slidable in said guideway, a king pin secured to said draw bar and depending through said slot, said draw bar having a series of tapered openings in one side thereof, transverse guide means fastened to said bearing plate, a locking member slidable in said transverse guide means, said locking member having a tapered nose portion adapted selectively to engage said draw bar at said selected openings, a spring acting on said locking member to urge the same into locking engagement with said draw bar, and a manual control rod for retracting said locking member to disengage the draw bar.

References Cited in the file of this patent

UNITED STATES PATENTS

| Re. 23,704 | De Lay | Sept. 1, 1953 |
| 1,887,118 | Collinge | Nov. 8, 1932 |
| 2,495,943 | Peterson | Jan. 31, 1950 |
| 2,831,704 | Tenenbaum | Apr. 22, 1958 |